United States Patent Office 3,560,616

Patented Feb. 2, 1971

3,560,616

PROCESS OF PROTECTING VEGETATION FROM FUNGI USING QUINOXALINE FOLIAR FUNGICIDES

Richard R. Shaffer, Wilmington, Del., assignor to E. I. du Pont de Nemours and Company, Wilmington, Del., a corporation of Delaware No Drawing. Filed June 17, 1968, Ser. No. 737,294
Int. Cl. A01n *9/22*
U.S. Cl. 424—250 12 Claims

ABSTRACT OF THE DISCLOSURE

A process has been developed for the protection of vegetation from fungi. This process involves the application of a 2,3-bis(haloalkyl)quinoxaline to the locus of vegetation in amounts to protect the vegetation from the fungi.

BACKGROUND OF THE INVENTION

Under many circumstances, crop and ornamental plants are attacked by disease-causing fungi and bacteria. The resulting disorders may seriously damage or even kill the host plants. In consequence of such depredation, there is vast economic loss throughout the world every year.

Although there are available numerous chemical compounds (fungicides and bactericides) which aid in preventing diseases of agricultural crops, each of these has practical deficiencies which restrict its use. Among these deficiencies are excessive phytotoxicity to certain crops, high cost, discomfort to the applicator, toxocity hazard to the applicator or the food-consuming public, undesirable (either inadequate or excessive) residual life on the crop parts, lack of compatibility with other chemicals that need also to be applied to the crop in question, and unsuitability for desired type of formulation. The availability of further highly active compounds which desirable use characteristics would represent a substantial contribution in the struggle to produce adequate food for the world population.

Of the organisms responsible for diseases on agricultural crops, the fungi classed as Phycomycetes are among the most virulent. The disorders caused by this group of fungi include late blight of tomatoes and potatoes, downy mildews of grapes and cucurbits, and Pythium root rots. Diseases caused by Phycomycetes are especially susceptible to control by the compounds, composition and methods, of this invention. Many other plant diseases, however, are also controlled.

SUMMARY OF THE INVENTION

It has been found that 2,3-bis(haloalkyl)quinoxalines and their oxides exhibit good activity as an agricultural foliage fungicide. These quinoxalines and their oxides are represented by the formula

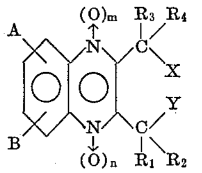

(I)

where $R_1$ and $R_3$ are separately selected from hydrogen or an alkyl of one through four carbon atoms, $R_2$ and $R_4$ are separately selected from hydrogen or methyl, X and Y are separately selected from chlorine, bromine, fluorine or iodine, A is alkyl of one through four carbon atoms, alkoxy of one through four carbon atoms, chlorine, bromine, fluorine, iodine, nitro, hydroxy or hydrogen, B is hydrogen, methyl, fluorine, chlorine, bromine or nitro and *m* and *n* are separately 0 or 1.

The preferred fungicidally active compounds are those of the formula

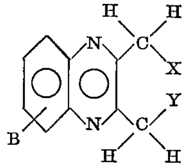

where X and Y are the same substituent and are bromine or iodine and B is hydrogen, methyl, fluorine, chlorine, bromine or nitro.

These compounds are applied to the locus of the foliage and fruit to be treated in an amount to effectively control fungus growth on the treated vegetation.

PREPARATION OF THE COMPOUNDS

The 2,3-bis(haloalkyl)quinoxalines of type III can be prepared as illustrated in Equation 1.

(1)

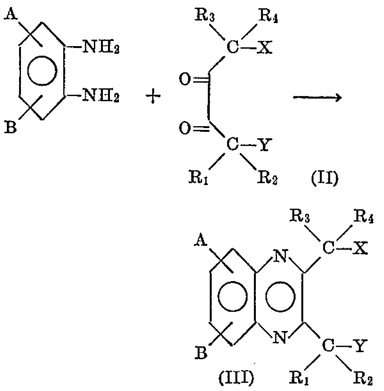

The dibromo and dichloro α-diketones of type II can be prepared by heating the appropriate diketone in a suitable nonpolar solvent such as chloroform, with the elemental halogen [Keller, Ber. 23, 35(1890)]. The diiodo-and difluoro-α-diketones are prepared by refluxing the appropriate dibromo-diketone with sodium iodide or sodium fluoride respectively, in a suitable solvent such as acetone or dimethyl sulfone [Dahn, Helv. Chim. Acta, 29, 95-101 (1946)].

The monobromo- and monochloro-α-diketones (X=Br or Cl and Y=H) are prepared by selective bromination followed by fractional distillation [Lloyd J. Meuli, Dow Chem. Co., U.S. Pat. 2,775,067]. Further reaction with different halogens or sodium halides gives mixed dihalodiketones.

The quinoxalines are routinely prepared by heating the diamine with the appropriate diketone in a suitable nonpolar solvent such as benzene. The water of reaction can be collected in a water trap and the product can be crystallized from the benzene solution by dilution with a hydrocarbon such as hexane. The reaction can also be run in alcohol at reflux temperatures [O. W. Westphal and K. Jann. Ann. 605, 8–15 (1957)].

The quinoxaline mono- and di-N-oxides can be prepared as illustrated in Equation 2 by heating the quinoxaline with a suitable oxidizing agent such as m-chloroperbenzoic (2)

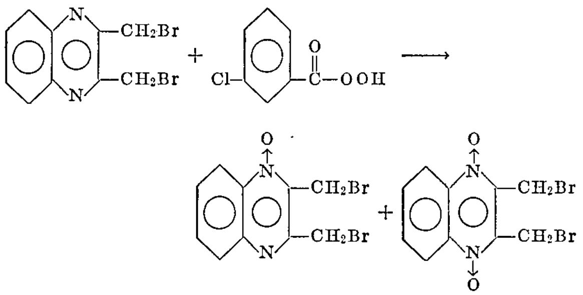

(IV) (V)

acid in a suitable solvent such as chloroform. The reaction mixture may then be washed with water and sodium carbonate solution to remove the spent oxidizing agents. The monoxide IV and dioxide V may be separated on a silica gel column or by crystallization. In some instances, when an excess of oxidizing agent is used, only dioxide of the type V can be isolated. The use of equivalent amounts of oxidizing agent generally leads to the predominant formation of monoxide of the type IV.

COMPOSITIONS

Compositions of the present invention can be prepared by mixing at least one of the quinoxalines or quinoxaline oxides with pest control adjuvants or modifiers to provide compositions in the form of dusts, granules, pellets, water-dispersible powders, high-strength concentrates, aqueous dispersions or emulsions, and solutions or dispersions in organic liquids.

Thus, the compounds of Formula I can be used with a carrier or diluent agent such as a finely divided solid, an organic liquid, water, a wetting agent, a dispersing agent, an emulsifying agent, or any suitable combination of these.

Compositions of the invention, especially liquids and wettable powders, contain as a conditioning agent one or more surface-active agents, sometimes called surfactants, in amounts sufficient to render a given composition containing the quinoxalines or quinoxaline oxides readily dispersible in water or in oil.

The surface-active agent used in this invention can be a wetting, dispersing or an emulsifying agent which will assist dispersion of the compound. The surface-active agent or surfactant can include such anionic, cationic and nonionic agents as have heretofore been generally employed in pesticide compositions of similar type. Suitable surface-active agents are set forth, for example, in "Detergents and Emulsifiers" 1967 Annual by John W. McCutcheon, Inc.

In general, less than 10% by weight of the surface-active agents will be used in compositions of this invention and ordinarily the amount of surface-active agents will range from 1–5% but may even be less than 1% by weight.

(A) Wettable powders

Wettable powders are water-dispersible compositions containing the active material, an inert solid extender, and one or more surfactants to provide rapid wetting and prevent heavy flocculation when suspended in water.

The classes of extenders suitable for the wettable powder formulations of this invention are the natural clays, diatomaceous earth, synthetic mineral fillers derived from silica and silicate, and organic flours such as wood, soybean, walnut shell, corn cob, tobacco stem, and cotton seed. Most preferred fillers for this invention are kaolinites, attapulgite clay, montmorillonite clays, synthetic silicas, synthetic magnesium silicate and calcium sulfate dihydrate.

Suitable surfactants for use in such compositions are those listed by J. W. McCutcheon in "Detergents and Emulsifiers" 1967 Annual. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oil, and ditertiary acetylenic glycols. Preferred dispersants are methyl cellulose, polyvinyl alcohol, lignin sulfonates, polymeric alkylnaphthalene sulfonates, sodium naphthalenesulfonate, polymethylene bisnaphthalenesulfonate, and sodium - N - methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 25 to 90 weight percent active material, from 0.5 to 2.0 weight percent wetting agent, from 0.25 to 5.0 weight percent dispersant, and from 9.25 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

(B) High-strength compositions and aqueous suspension concentrates

High-strength compositions generally consist of 90 to 99.5% active ingredient and 0.5 to 10% of a liquid or solid surfactant such as those described by McCutcheon in "Detergents and Emulsifiers" 1967 Annual. Such high-strength compositions can often be used in a manner similar to the wettable powders but they are also suitable for further formulation.

The aqueous suspension concentrates are prepared by mixing together and sand grinding an aqueous slurry of water-insoluble active ingredient in the presence of dispersing agents. Thus, there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15 to 40% of active ingredient, from 45 to 70% water with the remainder made up of surfactants, corrosion inhibitors, and suspending agents.

Suspensions in organic liquids can be prepared in a similar manner such as by replacing the water with mineral oil.

(C) Dusts

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the dust compositions of this invention the inert extender may be either of vegetable or mineral origin, the wetting agent is preferably anionic or non-ionic and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid absorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation, some liquid non-ionic agents are also suitable in the dust formulations.

Preferred inert solid extenders for the dusts of this invention are micaceous talcs, pyrophyllite, dense kaolin clays, tobacco dust and ground calcium phosphate rock such as that known as "Phosphodust," a trademark of the American Agricultural Chemical Company.

Preferred grinding aids are attapulgite clay, diatomaceous silica, synthetic fine silica and synthetic calcium and magnesium silicates. Preferred wetting agents are those previously described under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above can also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 1 to 20 weight percent active material, 5 to 50 weight percent absorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

(D) Emulsifiable oils

Emulsifiable oils are usually solutions of active material in non-water miscible solvents together with a surfactant.

For the compounds of this invention, emulsifiable oils can be made by mixing the active ingredient with a solvent and surfactant. Suitable solvents for the compounds of this invention are aromatic and aliphatic hydrocarbons, chlorinated solvents, and water-immiscible ethers, esters, or ketones. Suitable surfactants are thos anionic or non-ionic agents known to the art as emulsifying agents. Such compounds can be found listed in "Detergents and Emulsifiers" 1967 Annual by John W. McCutcheon, Inc.

Emulsifying agents most suitable for the emulsifiable oil compositions of this invention are long-chain alkyl or mercaptan polyethoxy alcohols, alkylaryl polyethoxy alcohols, sorbitan fatty acid esters, polyoxyethylene ethers with sorbitan fatty acids esters, polyethylene glycol esters with fatty or rosin acids, fatty alkylol amide condensates, calium and amine salts of fatty alcohol sulfates, oil soluble petroleum sulfonates or, preferably, mixtures of these emulsifying agents. Such emulsifying agents will comprise from about 1 to 10 weight percent of the total composition.

Thus, emulsifiable oil compositions of the present invention will consist of from about 15 to 50 weight percent active material, about 40 to 82 weight percent solvent, and about 1 to 10 weight percent emulsifier, as these terms are defined and used above.

In some instances the oil solution may be intended merely for extension with other oils, such as weed oils. In this instance the emulsifying agents may be omitted and may be replaced by additional solvent.

(E) Granules and pellets

Granules and pellets are physically stable, particulate compositions containing a compound of Formula I which adheres to or is distributed through a basic matrix of a coherent, inert carrier with macroscopic dimensions. In order to aid leaching of the active ingredient from the granule or pellet, a surfactant can be present.

For the compounds of this invention, the inert carrier is preferably of mineral origin, and the surfactant compounds are listed by John W. McCutcheon in "Detergents and Emulsifiers" 1967 Annual.

Suitable carriers are natural clays, some pyrophyllites, and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight percent of the total weight. The second, which are also suitable for pellets, are initially powdered kaolin clays, hydrated attapulgite, or bentonite clays in the form of sodium, calcium or magnesium bentonites. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with 25 to 30 weight percent active component, but more frequency a concentration of about 10 weight percent is desired for optimum distribution. The granular compositions of this invention are most useful in a size range of 15–60 mesh, i.e. 0.25–1.25 millimeters.

The most suitable wetting agents for the granular compositions of this invention depend upon the type of granule used. When preformed granules are sprayed with active material in liquid form the most suitable wetting agents are non-ionic, liquid wetters miscible with the solvent. These are compounds more generally known to the art as emulsifiers, and comprise alkylaryl polyether alcohols, alkyl polyether alcohols, polyoxyethylene sorbitan fatty acid esters, polyethylene glycol esters with fatty or rosin acids, fatty alkylol amide condensates, oil-soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular or pelleted formulations of this invention comprise from about 5 to 30 weight percent active material, about 0 to 5 wegiht percent wetting agent, and about 65 to 95 weight percent inert mineral carrier, as these terms are used herein.

A wide variety of diseases of foliage, fruit, stems, and roots of growing plants is controlled without damage to the host. Fruits, tubers, bulbs, roots, seeds, foliage and other plant parts harvested for food, animal feeds, or for other purposes are protected from fungus deterioration during processing, distribution, and storage. Seeds, tubers, cuttings, and other plant propagation materials are protected from fungus and bacterial attack during handling and storage, as well as in the soil after planting.

The many fungi and bacteria against which the compounds and methods of this invention are effective may be represented by, but are not limited to, the following: *Phytophthora infestans,* which causes late blight of potato and tomato; *Phytophthora cinnamomi,* which causes root rot of many perennial plants and heart rot of pineapple; *Phytophthora parasitica* and *P. citiophthora,* which cause foot rot and brown fruit rot of citrus; *Plasmopara viticola,* which causes downy mildew of grape; *Pseudoperonospora cubensis,* which causes downy mildew of cucurbits; *Phytophthora phaseoli,* which causes downy mildew of lima bean; *Peronospora effusa,* which causes downy mildew of spinach; *Venturia insaequalis,* which causes apple scab; various species of Rhizoctonia and Pythium present in soil and attacking the roots or other underground parts of a variety of plants; *Uromyces phaseoli,* which causes bean rust; *Puccinic recondita, P. coronata,* and *P. glumarum,* which cause leaf rusts of wheat, oats, and grasses, respectively; *Puccinia graminis tritici,* which causes stem rust of wheat; *Podosphaera leucotricha,* which causes powdery mildew of apple; *Erysiphe cichoracearum,* which causes powdery mildew of cucurbit crops; *Piricularia oryzae,* which causes blast of rice; *Uncinula necator,* which causes powdery mildew on grapes; and *Xanthomonas vesicatoria,* which causes bacterial spot of tomato.

The compounds of this invention provide protection from damage caused by certain fungi and bacteria when applied to the proper locus by the methods described hereinafter and at a sufficient rate to exert the desired effect. They are especially suited for the protection of living plants such as fruit-bearing trees, nut-bearing trees, ornamental trees, forest trees, vegetable crops, horticultural crops (including ornamentals, small fruits, and berries), fiber crops, grain and seed crops, sugarcane, sugar beets, pineapple, forage and hay crops, beans, peas, soybeans, peanuts, potatoes, sweet-potatoes, tobacco, hops, turf, and pasture.

Living plants may be protected from fungi (especially those classed as Phycomyetes) and certain bacteria by applying one or more of the compounds of this invention to the soil in which they are growing or in which they may subsequently be seeded or planted, to seeds, tubers, bulbs, or other plant reproductive parts prior to planting, as well as to foliage, stems, and/or fruit of the living plant. Living plants may also be protected by dipping the root system.

Preferred rates of application for the compounds of this invention to foliage, stems, and/or fruit of living plants range from 0.25 to 70 kilos of active ingredient per hectare. More preferred rates are in the range of 0.5 to 35 kilos per hectare. The most preferred rates are in the range of 1.0 to 15 kilos per hectare. The optimum amount within this range depends upon a number of variables which are well known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days.

Preferred rates for application of the compounds of this invention to soil in which plants are or will be growing range from 1 to 500 parts per million by weight of the soil in which the roots are or will be growing. More preferred use rates are in the range of 2 to 200 parts per million. The most preferred rates are in the range of 5 to 50 parts per million.

Preferred rates for application to seeds, tubers, bulbs, or other plant reproductive parts range from 25 to 8,000 grams of active compound of this invention per 100 kilos of planting material treated. More preferred rates are in the range of 50 to 4,000 grams of active compound per 100 kilos. The most preferred rates are in the range of 100 to 2,000 grams per 100 kilos. Applications of this type are made from dusts, slurries, or solutions.

Preferred rates for dip applications to roots of living plants are in the range of 1 to 4,000 grams of active ingredient per 100 liters of water or other liquid carrier. More preferred rates are in the range of 2 to 2,000 grams per 100 liters. The most preferred rates are in the range of 4 to 1,000 grams per 100 liters.

Plant parts, such as fruits, tubers, bulbs, roots, and the like, harvested for food or feed are protected from decay and other deterioration caused by fungi or bacteria during processing, distribution, and storage by treatment with an active compound of this invention. The plant parts to be so protected are dipped in a liquid bath containing the active ingredient, dusted with a finely divided preparation of the active ingredient, sprayed, or misted with an aerosol. The liquid bath contains an amount of the active ingredient in the range of 100 to 50,000 parts per million of the weight of the fluid. A more preferred range for the bath is 500 to 10,000 parts per million, and the most preferred range is 1,000 to 5,000 parts per million. Dusts used for this type of application contain 1.0 to 20% by weight of the active ingredient. More preferred rates are in the range of 2.0 to 10%, and the most preferred rates are in the range of 3.0 to 5% percent by weight.

In the discussion of application rates and other points above, certain use methods were mentioned in the interest of clarification relative to the matters under consideration there. As use methods are an important component of this total invention, more should be said on this subject.

As was pointed out earlier, the compounds of this invention are especially suited for use on living plants. Application to the foliage, stems, and fruit of plants at the rates indicated above is generally accomplished by employing sprays, dusts, or aerosols containing the proper amount of active ingredient. For the control of fungi and bacteria regularly present, applications often start prior to the time that the problem actually appears and continue on a predetermined schedule.

Disease control with the compounds of this invention is sometimes improved by including a proper quantity of a surface active agent in the spray or dust applied to the plant. The most preferred surface active agents for this purpose include vinyl or other polymeric resins, glycol esters, ethoxylated fatty acids, alcohol sulfates, lecithin and lecithin derivatives, isethionates, certain phosphate derivatives, and taurates. Somewhat less preferred but, nevertheless, effective surface active agents include sulfosuccinate derivatives, ethoxylated fatty esters and oils, ethoxylated alcohols, and dodecyl and tridecyl benzene sulfonates and free acids. Examples of specific surface active agents in each of these several categories are listed on pages 11 to 17 inclusive in "Detergents and Emulsifiers" 1965 Annual, published by John W. McCutcheon, Inc., 236 Mt. Kemble Ave., Morristown, N.J.

The preferred rates for these surfactants when used in sprays are in the range from 10 to 10,000 parts per million of the spray fluid. More preferred rates are in the range of 30 to 3,000 parts per million. The most preferred rates are in the range of 100 to 1,00 parts per million. For dusts, the preferred surfactant rates are in the range of 1,000 to 300,000 parts per million of the material actually applied. More preferred rates are in the range of 5,000 to 200,000 parts per million and the most preferred rates are in the range of 10,000 to 100,000 parts per million.

The compounds of this invention can often be used to alvantage in combinations or mixtures with one or more of the fungicides, bactericides, insecticides, acaricides, or nematocides available on the market today. The combinations or mixtures can be made by the applicator just prior to use (as in the tank of a sprayer) or included in a single composition by the manufacturer or a subsequent processor as will be discussed in more detail hereinafter. Illustrative of the materials that may be included in such combinations or mixtures are the following:

1,2,3,4,10,10-hexachloro-1,4,4a,5,8,8a-hexahydro-1,4-endoexo-5,8-dimethanonaphthalene (aldrin);
1,2,3,4,5,6-hexachlorocyclohexane (lindane);
1,2,4,5,6,7,8,8-octachloro-2,3,3a,4,7,7a-hexahydro-4,7-methanonindene (chlordane);
1,1,1-trichloro-2,2-bis(p-chlorophenyl)ethane (DDT);
1,2,3,4,10,10-hexachloro-6,7-epoxy-1,4,4a,5,6,7,8,8a-octahydro-1,4-endoexo-5,8-dimethanonaphthalene (dieldrin);
1,2,3,4,10,10-hexachloro-6,7-epoxy-1,4,4a,5,6,7,8,8a-octahydro-1,4-endoendo-5,6-dimethanonaphthalene (endrin);
2-(methylcarbonylamino)-1-benzimidazolecarboxylic acid, methyl ester;
1,(or 3a),4,5,6,7,8,8-heptachloro-3a,4,7,7a-tetrahydro-4,7-methanoindene;
1,1,1-trichloro-2,2-bis(p-methoxyphenyl)ethane (methoxychlor);
1,1-dichloro-2,2,-bis(p-chlorophenyl)ethane (TDE);
chlorinated camphene having a chlorine content of 67–69% (toxaphene);
chlorinated terpenes having a chlorine content of ca. 66% (Strobane®);
2-nitro-1,1-bis(p-chlorophenyl)butane;
1-naphthyl-N-methylcarbamate (carbaryl);
methylcarbamic acid, ester with 4-(dimethylamino)-3,5-dimethylphenol;
methylcarbamic acid, ester with 1,3-dithiolan-2-one oxime;
methyl N-methylthiolcarbamate;
O,O-diethyl-O-[2-isopropyl-4-methylpyrimid-6-yl] thiophosphate (diazinon);
O,O-dimethyl-1-hydroxy-2,2,2-trichloroethyl phosphonate;
O,O-dimethyl-S-(1,2-dicarbethoxyethyl) dithiophosphate (malathion);
O,O-dimethyl-O-p-nitrophenyl thiophosphate (methyl parathion);
O,O-diethyl-o-p-nitrophenyl thiophosphate (parathion);
O,O-dimethyl-o-(3-chloro-4-nitrophenyl) thiophosphate;
di-2-cyclopentenyl-4-hydroxy-3-methyl-2-cyclopenten-1-one chrysanthemate;
O,O-dimethyl-O-(2,2-dichlorovinyl) phosphate (DDVF);
mixture containing 53.3% "Bulan," 26.7% "Prolan" and 20.0% related compounds;
O,O-dimethyl-O-(2,4,5-trichlorophenyl) phosphorothioate;
O,O-dimethyl-S-(4-oxo-1,2,3-benzotriazine-3(4H)-yl-methyl) phosphorodithioate (Guthion®);
bis(dimethylamino)phosphonous anhydride;
O,O-diethyl-O-(2-keto-4-methyl-7-α′-pyranyl thiophosphate;
O,O-diethyl (S-ethyl mercaptomethyl) dithiophosphate (phorate);
calcium arsenate;
sodium aluminofluoride;
dibasic lead arsenate;
2′-chloroethyl-1-methyl-2-(p-tert-butylphenoxy) ethyl sulfite;
azobenzene;
ethyl 2-hydroxy-2,2-bis(4-chlorophenyl) acetate;
O,O-diethyl-O-[2-(ethylmercapto)ethyl]thiophosphate;
2,4-dinitro-6-sec-butyl phenol;
O-ethyl O-p-nitrophenylbenzenethiophosphonate (EPN);
4-chlorophenyl-4-chlorobenzene sulfonate;
p-chlorophenyl phenyl sulfone;
tetraethyl pyrophosphate;
1-1-bis(p-chlorophenyl)ethanol;
1,1-bis(chlorophenyl)-2,2,2-trichloroethanol (dicofol);
p-chlorophenyl p-chlorobenzyl sulfide bis(p-chlorophenoxy)methane;
3-(1-methyl-2-pyrrolidyl)pyridine;
mixed esters of pyrethrolone and cinerolone keto-alcohols and two chrysanthemum acids;
cube and derris, both whole root and powdered;
ryanodine;
mixture of alkaloids known as veratrine;
dl-2-allyl-4-hydroxy-3-methyl-2-cyclopenten-1-one esterified with a mixture of cis and trans dl-chrysanthemum monocarboxylic acids;
butoxypolypropylene glycol;
p-dichlorobenzene;
2-butoxy-2′-thiocyanodiethyl ether;
naphthalene;
1,1-dichloro-2,2-bis(p-ethylphenyl) ethane;
p-dimethylaminobenzenediazo sodium sulfonate;
quinone oxyaminobenzooxohydrazone;
tetramethyl thiuram monosulfide;
tetramethyl thiuram disulfide (thiram);
metal salts of ethylene bisdithiocarbamic acid, e.g., manganese, zinc, iron and sodium salts;
pentachloronitrobenzene;
2,3-dihydro-5-carboxyanilido-6-methyl-1,4-oxathiin;
n-dodecylguanidine acetate (dodine);
N-trichloromethylthiotetrahydrophthalimide (captan);
phenylmercury acetate;
2-4-dichloro-6-(o-chloroanilino)-s-triazine (Dyrene®);
N-methylmercury p-toluenesulfonanilide;
chlorophenolmercury hydroxides;
nitrophenolmercury hydroxides;
ethylmercury acetate;
ethylmercury 2,3-dihydroxypropyl mercaptide;
methylmercury acetate;
methylmercury 2,3-dihydroxypropyl mercaptide (Ceresan® L);
3,3′-ethylenebis(tetrahydro-4,6-dimethyl-2H-1,3,5-thiadiazine-2-thione) (Cylan®);
methylmercury dicyandiamide;
N-ethylmercury p-toluenesulfonanilide;
1,4-dichloro-2,5-dimethoxy benzene (chloroneb);
metal (e.g., iron, sodium and zinc), ammonium and amine salts of dialkyldithiocarbamic acids;
tetrachloronitroanisole;
2-benzimidazole carbamic acid, methyl ester;

1-(butylcarbamoyl)-2-benzimidazole carbamic acid methyl ester;
hexachlorobenzene;
hexachlorophene;
methylmercury nitrile;
tetrachloroquinone;
N-trichloromethylthiophthalimide (folpet);
5-ethoxy-3-trichloromethyl-1,2,4-thiadiazole;
1,2-dibromo-3-chloropropane;
dichloropropane-dichloropropene mixture;
ethylene dibromide;
1-chloro-2-nitropropane;
chloropicrin;
sodium dimethyldithiocarbamate;
tetrachloroisophthalonitrile;
2-carboxyamino-1-benzimidazocarboxylic acid, dimethyl ester;
streptomycin;
2-(2,4,5-trichlorophenoxy)propionic acid;
p-chlorophenoxyacetic acid;
1-naphthaleneacetamide;
N-1-naphthylacetamide;
S-methyl N-[(methylcarbamoyl)oxy]thioacetimidate (methomyl); and
S-methyl N-[(carbamoyl)oxy]thioacetimidate.

The additional pesticides are employed in mixtures or combinations in amounts ranging from one-tenth to ten times that of the compound or compounds of this invention. The proper choice of amounts for the added pesticides is readily made by one skilled in the art of protecting plants from pest depredations.

The use of pesticides such as those listed above in combination with a compound of this invention sometimes appears to greatly enhance the activity of the compound of the invention. In other words, an unexpected degree of activity is sometimes seen when another pesticide is used along with a compound of this invention.

The pesticides from the above list that are preferred for use in mixtures or combinations along with the compounds of this invention are: toxaphene, methoxychlor, DDT, TDE, malathion, Diazinon®, parathion carbaryl, Lannate® methomyl, Guthion® azinphosmethyl, EPN, Kelthane® dicofol, captan, dodine, folpet, thiram, sulphur, maneb, Difolatan, tri-basic copper sulfate, and streptomycin sulfate.

Specific embodiments of useful combinations and mixtures, along with representative (but not restrictive) applications, follow:

(a) 2-3-bis(bromomethyl)quinoxaline and carbaryl in ratios ranging from 1:3 to 3:1 for use on potatoes to control late blight along with insects such as the Colorado potato beetle and flea beetles. Where aphids are a factor, parathion or Diazinon® may also be added to the mixture at rates ranging from one-tenth to one-half the level of the carbaryl. The further addition of tri-basic copper sulfate to the mixture at one-half to four times the level of the 2,3-bis(bromomethyl)quinoxaline improves the long-term residual disease control, particularly where early blight is present. The 2,3-bis(bromomethyl)quinoxaline in the mixture can be replaced by other compounds of this invention.

(b) 2,3-bis(bromomethyl)-6-chloro quinoxaline and DDT in ratios ranging from 1:4 to 4:1 for use on apple trees to control diseases such as scab and powdery mildew, as well as a variety of insects including the codling moth, the fall webworm, and the apple red bug. The 2,3-bis(bromomethyl)-6-chloroquinoxaline may be replaced in the combination by other compounds of this invention. The DDT may be replaced by methoxychlor or Guthion®. TDE can be added at the same rate as the other insecticide where the red-banded leaf roller is a particular problem. Thiram can be added to the mixture at the same rate as the compound of this invention to improve control of certain of the late-season fruit spot diseases.

(c) 2,3-bis(iodomethyl)quinoxaline and Kelthane® dicolfol in ratios ranging from 1:3 to 3:1 for use on squash to control downy and powdery mildews along with red spider mites. The 2,3-bis(iodomethyl)quinoxaline may be replaced in this combination by any other compound of this invention. The Kelthane® dicofol in the mixture may be replaced by malathion.

(d) 2,3 - bis(chloromethyl)quinoxaline and maneb in ratios of 1:3 to 3:1 for use on tomatoes to control a disease complex involving two or more from the group including late blight, early blight (Alternaria), anthracnose (Colletotrichum), and gray leaf spot (Stemphylium). Lannate® methomyl may be added to the mixture in insecticidal amounts to provide control of tomato fruitworm and hornworm. The 2,3 - bis(chloromethyl)-quinoxaline may be replaced in the mixture by any other compound of the invention.

(e) 2,3-bis(bromomethyl - 6 - methyl quinoxaline and EPN in ratios ranging from 1:3 to 3:1 for use on grape vines in the field to control diseases such as downy mildew and powdery mildew, as well as mites and the grapeberry moth. The 2,3 - bis(bromomethyl) - 6 - methylquinoxaline may be replaced in such a combination by any other compound of this invention. Captan and folpet may be added to the combination at rates ranging from one-half to twice that of the compound of this invention to provide improved control of dead arm and black rot.

(f) 2,3-bis(bromoethyl) - 5 - nitroquinoxaline along with dodine and wettable sulfur in ratios ranging from 1:3:6 to 3:1:3 for the superlative control of scab, powdery mildew, mites, black rot, cedar apple rust, and frog-eye leaf spot. Other compounds of this invention may be substituted for 2,3 - bis(bromomethyl) - 5 - nitroquinoxaline in such combinations.

(g) 2,3 - bis(bromomethyl)quinazoline - 1 - oxide and toxaphene in ratios ranging from 1:3 to 3:1 for use on lima beans to control downy mildew and anthracnose, as well as insects such as cutworms, lygus bugs, and caterpillars. Copper sulfate or streptomycin sulfate may be added to the combination at active levels where bacterial diseases are a factor. Other compounds of this invention may be substituted for 2,3 - bis(bromomethyl) 1 oxide quinazoline in such combinations.

(h) 2,3 - bis(bromomethyl)quinoxaline and Difolatan in ratios ranging from 1:3 to 3:1 for use on onions for the superlative control of downy mildew and purple blotch. Such a combination also is of value for the control of disease complexes on other crops including apples, peaches, cacao, cucurbits, potatoes and tomatoes.

The following examples are presented to better exemplify the invention and the invention is not meant to be limited to the disclosed examples. All parts and percents expressed in the examples are by weight unless otherwise stated.

EXAMPLE 1

Preparation of 2,3-bis(bromoethyl)-6-chloroquinoxaline

The 4 - chloro - o - phenylenediamine (20 parts) and 300 parts of benzene are combined. The 1,4-dibromo-2,3-butanedione (34.1 parts) is dissolved in 100 parts benzene and added dropwise. A temperature rise of 10° C. occurs and the solution is boiled under reflux for one hour. The water of reaction is trapped in a water collector. The benzene solution is washed with three portions of water. On the last wash the mass solidifies and 50 parts of product is collected by filtration. The solid is washed several times with hexane and air-dried (M.P. 149.5–150° C.

The following compounds are prepared in a similar manner by substituting equivalent amounts of the appropriate diamine and diketone for the 4-chloro-o-phenylenediamine and the 1,4 - dibromo - 2,3 - butanedione as indicated in the following table.

| Diamine | Diketone | Quinoxaline |
|---|---|---|
| 4-nitro-o-phenylenediamine | 1,4-dichloro-2,3-butanedione | 2,3-bis(chloromethyl)-6-nitro-. |
| Do | 1,4-dibromo-2,3-butanedione | 2,3-bis(bromomethyl)-6-nitro-. |
| Do | 1,4-diiodo-2,3-butanedione | 2,3-bis(iodomethyl)-6-nitro-. |
| o-Phenylenediamine | 1,4-difluoro-2,3-butanedione | 2,3-bis(fluoromethyl)-. |
| Do | 1,4-dibromo-2,3-butanedione | 2,3-bis(bromomethyl)-. |
| Do | 1,4-dichloro-2,3-butanedione | 2,3-bis(chloromethyl)-. |
| Do | 1,4-diiodo-2,3-butanedione | 2,3-bis(iodomethyl)-. |
| 4-chloro-o-phenylenediamine | 1,4-dichloro-2,3-butanedione | 2,3-bis(chloromethyl)-6-chloro-. |
| Do | 1,4-dibromo-2,3-butanedione | 2,3-bis(bromomethyl)-6-chloro-. |
| Do | 1-chloro-4-bromo-2,3-butanedione | 2-chloromethyl-3-bromomethyl-6-chloro-. |
| 5-chloro-3-nitro-o-phenylenediamine | 1,4-dichloro-2,3-butanedione | 2,3-bis(chloromethyl)-7-chloro-5-nitro-. |
| Do | 1,4-dibromo-2,3-butanedione | 2,3-bis(bromomethyl)-7-chloro-5-nitro-. |
| Do | 1-fluoro-4-bromo-2,3-butanedione | 2-fluoromethyl-4-bromomethyl-7-chloro-5-nitro-. |
| 4-methyl-o-phenylenediamine | 1,4-dichloro-2,3-butanedione | 2,3-bis(chloroethyl)-6-methyl-. |
| Do | 1,4-dibromo-2,3-butanedione | 2,3-bis(bromoethyl)-6-methyl-. |
| Do | 1-chloro-4-iodo-2,3-butandeione | 2-chloromethyl-3-iodomethyl-6-methyl-. |
| 4-methoxy-o-phenylenediamine | 1,4-dichloro-2,3-butanedione | 2,3-bis(chloromethyl)-6-methoxy-. |
| Do | 1,4-dibromo-2,3-butanedione | 2,3-bis(bromomethyl)-6-methoxy-. |
| Do | 1-bromo-4-iodo-2,3-butanedione | 2-bromoethyl-3-iodomethyl-6-methoxy-. |
| 4-butoxy-o-phenylenediamine | 1,4-dichloro-2,3-butanedione | 2,3-bis(chloromethyl)-butoxy-. |
| Do | 1,4-dibromo-2,3-butanedione | 2,3-bis(bromomethyl)-6-butoxy-. |
| Do | 1-fluoro-4-iodo-2,3-butanedione | 2-fluoromethyl-3-iodomethyl-6-butoxy-. |
| 4-butyl-o-phenylenediamine | 1-chloro-4-fluoro-2,3-butanedione | 2-chloromethyl-3-fluoromethyl-6-butyl-. |
| 4-fluoro-o-phenylenediamine | 1,4-dibromo-2,3-butanedione | 2,3-bis(bromomethyl)-6-fluoro-. |
| Do | 1,4-dibromo-2,3-pentanedione | 2-bromomethyl-3-(α-bromoethyl)-. |
| Do | 1,4-dibromo-2,3-octanedione | 2-bromomethyl-3-(α-bromopentyl)-. |
| Do | 5,8-dibromo-6,7-dodecadione | 2,3-bis(α-bromopentyl)-. |
| Do | 1-chloro-4-iodo-2,3-pentanedione | 2-chloromethyl-3-(α-iodoethyl)-. |
| Do | 2,5-dimethyl-2,5-dibromo-3,5-hexanedione | 2,3-bis(α-methyl-α-bromoethyl)-. |
| Do | 5,8-dibromo-5,8-dimethyl-6,7-dodecadione | 2,3-bis(α-methyl-α-bromopentyl)-. |

EXAMPLE 2

Preparation of 2,3-bis(bromomethyl)quinoxaline-1,4-dioxide

The 2,3-bis(bromomethyl)quinoxaline (10 parts) is dissolved in 500 parts of chloroform. The m-chloroperbenzoic acid (11.0 parts) is added as a powder in one portion. The chloroform mixture is refluxed for 36 hours at which time the mixture is extracted with 5 portions of 5% sodium carbonate solution and 5 portions of water. The chloroform solution is dried and evaporated in vacuo to give a yellow solid. The material is a mixture of at least two components as indicated by thin-layer chromatography in chloroform. The two compounds are separated by chromatography on silica gel. The first component eluted in the 2,3-bis(bromomethyl)-quinoxaline-1-oxide (3.0 parts, M.P. 172–172.5° C.) and the second is 2,3-bis(bromomethyl)quinoxaline-1,4-dioxide, (4.0 parts, M.P. 188.5–189° C.).

The following compounds are prepared in a similar manner by substituting equivalent amount of a suitable quinoxaline for 2,3 - bis(bromomethyl)quinoxaline, and by substituting the oxidizing agent indicated below for the m-chloroperbenzoic acid.

| Quinoxaline | Oxidizing agent | N-oxides |
|---|---|---|
| 2,3-bis(bromomethyl)quinoxaline | Peracetic acid | 2,3-bis(bromomethyl)quinoxaline-1-oxide and 1,4-dioxide. |
| Do | Hydrogen peroxide | Do. |
| 2,3-bis(bromomethyl)-6-methylquinoxaline | Peracetic acid | 2,3-bis(bromomethyl)-6-methylquinoxaline-1-oxide and 1,4-dioxide. |
| 2,3-bis(bromomethyl)-6-methylquinoxaline | m-Chloroperbenzoic acid | Do. |
| 2,3-bis(bromomethyl)-6-methylquinoxaline | Hydrogen peroxide | Do. |
| 2,3-bis(bromomethyl)-6-chloroquinoxaline | Peracetic acid | 2,3-bis(bromomethyl)-6-chloroquinoxaline-1-oxide and 1,4-dioxide. |

EXAMPLE 3

| | Wt. percent |
|---|---|
| 2,3-bis(bromomethyl)quinoxaline | 25 |
| Sodium alkylnaphthalene sulfonate | 1.5 |
| Sodium ligninsulfonate | 3.5 |
| Attapulgite clay | 70 |

The above ingredients are blended and micropulverized to give a free-flowing powder in which substantially all of the particles are 50 microns or less.

The above wettable powder is extended with water at the rate of 100 liters of water per 800 grams of powder. The resulting suspension is sprayed at the rate of 800 liters per hectare on the foliage of potatoes within designated portions of a large potato field, the remainder of which is left unsprayed. Spray applications to the test plots begin when the potato plants are about 10 centimeters tall and continue at weekly intervals for a period of 12 to 14 weeks. The potato plants within the treated plots remain healthy and yield a good crop of sound tubers. Potato plants in the unsprayed area surrounding the test plots, on the other hand, are heavily damaged by the late blight fungus (*Phytophthora infestans*) as well as others and yield few marketable tubers. Other pesticides are added to the spray suspension to broaden the effect described above.

This formulation is also applied to tomatoes in the manner just described with resulting control of late blight (caused by *Phytophthora infestans*), early blight and Alternaria fruit rot (caused by *Alternaria solani*), gray mold (caused by *Botrytis cinerea*), gray leaf spot caused by (*Sptemphylium spp.*), and bacterial leaf spot (caused by *Xanthomonas vesicatoria*).

EXAMPLE 4

| | Percent |
|---|---|
| 2,3-bis(iodomethyl)quinoxaline | 90 |
| Sodium dioctyl sulfonsuccinate | 1 |
| Sodium ligninsulfonate | 3 |
| Synthetic fine silica | 6 |

After blending the above ingredients, the mixture is micropulverized to give a free-flowing powder in which substantially all of the particles are 50 microns or less.

The above formulation is extended with water to provide a suspension containing 300 grams of the powder per 100 liters of fluid. This suspension is applied at the rate of 1200 liters per hectare to alternate rows of grape vines in a vineyard. The remaining rows are left unsprayed. Applications to the test rows start soon after bud growth is initiated in the spring and continue at intervals of 7 to 14 days for a period of three months. At this time, the vines in the treated rows are healthy, support a heavy crop of high quality fruit and show evidence of excellent cane growth. The foliage on the vines in the untreated rows shows damage due to the downy mildew fungus (*Plasmopara viticola*) and the powdery mildew fungus (*Uncinula necator*). Also, the untreated vines have little useful fruit and show little new cane growth.

EXAMPLE 5

| | Percent |
|---|---|
| 2,3-bis(bromomethyl)-6-chloroquinoxaline | 50 |
| Ethoxylated alkyl phenol | 2 |
| Calcium ligninsulfonate | 3 |
| Corn cob flour | 45 |

The above ingredients are mixed in, for example, a ribbon blender and then micropulverized to yield a free-flowing powder in which substantially all of the particles are 50 microns or less.

The above wettable powder is added to water containing 400 parts per million of Triton B-1956 (a modified phthalic glycerol alkyd resin surfactant produced by the Rohm and Haas Co.). An amount of 500 grams of the powder is added to each 100 liters of water. The resulting suspension is sprayed at the rate of 800 liters per hectare on squash plants within designated plots in an otherwise untreated field. Applications are started just as the squash plants initiate runner development and are continued at weekly intervals for a period of three months. At this time the plants in the treated plots are well developed, have healthy foliage and support a large crop of marketable fruit. The adjacent untreated areas contain poorly developed plants with diseased foliage (powdery mildew caused by *Erysiphe cichoracearum* and downy mildew caused by *Pseudoperonospora cubensis*) and with little marketable fruit.

EXAMPLE 6

The following compounds are substituted one at a time for 2,3-bis(bromomethyl)-6-chloroquinoxaline of Example 5 in like amount by weight and are formulated and applied in like manner. Like results are obtained.

2,3-bis(bromoethyl)-6-nitroquinoxaline
2,3-bis(bromomethyl)quinoxaline
2,3-bis(iodomethyl)quinoxaline
2,3-bis(bromomethyl)-7-chloro-5-nitroquinoxaline
2,3-bis(bromomethyl)-6-bromoquinoxaline
2,3-bis(chloromethyl)quinoxaline
2,3-bis(fluoromethyl)quinoxaline
2,3-bis(bromomethyl)-6-methylquinoxaline
2,3-bis(bromomethyl)-6-methoxyquinoxaline
2,3-bis(bromomethyl)-6-hydroxyquinoxaline
2,3-bis(bromomethyl)-6-fluoroquinoxaline
2,3-bis(bromomethyl)-1,4-dioxidequinoxaline
2,3-bis(chloromethyl)-1,4-dioxidequinoxaline
2-bromomethyl-3-(1-bromoethyl)quinoxaline
2-bromomethyl-3-(1-bromopentyl)quinoxaline

EXAMPLE 7

| | Percent |
|---|---|
| 2,3-bis(bromomethyl)-6-methylquinoxaline | 15 |
| Hydrated attapulgite | 2 |
| $Na_2HPO_4$ | 0.8 |
| Sodium ligninsulfonate | 10 |
| Sodium pentachlorophenoxide | 0.6 |
| Water | 71.6 |

The above composition is mixed with an equal volume of Ottawa sand of 20–30 mesh and sandmilled for 45 minutes to yield a stable aqueous suspension which may be diluted with water for spray application.

The above formulation is diluted with water so as to provide a spray suspension containing 250 grams of the active ingredient per 100 liters of total fluid. This suspension is used to spray alternate trees in an apple orchard. Approximately 40 liters are applied to each tree at each application. Treatment is started as the leaf buds open in the spring and is continued at intervals of 7 to 14 days for a period of four months. At the end of this period the treated trees have healthy foliage and an excellent crop of high-quality fruit. The untreated trees, however, have diseased foliage and only a little small-sized and diseased fruit. The damage to the unsprayed trees is caused by the scab fungus (*Venturia inaequalis*) and the apple powdery mildew fungus (*Podosphaera leucotricha*),

EXAMPLE 8

| | Percent |
|---|---|
| 2,3-bis(bromomethyl)-5-nitroquinoxaline | 25 |
| Sodium ligninsulfonate | 15 |
| $Na_2HPO_4$ | 0.8 |
| Sodium pentachlorophenoxide | 0.6 |
| Hydrated attapulgite clay | 1.75 |
| Water | 56.85 |

The above components are mixed and sand ground or ball milled until substantially all particles of the active material are 5 microns or less. This stable aqueous dispersion can be diluted with water for application.

The above aqueous dispersion is diluted with water to provide a suspension containing 10 grams of the active ingredient per liter of fluid. Cut Irish potato seed pieces are dipped into the suspension for three minutes (only slight agitation is required to maintain a uniform suspension). After the treated seed pieces have dried, they are planted in alternate rows in a potato field. The rows planted with the treated seed pieces develop a full stand of healthy plants. Rows planted with similar but untreated seed pieces develop only a partial stand of unhealthy plants due to seed piece rot and attack on the underground portions of the young plants by soil fungi such as Pythium and Rhizoctonia.

EXAMPLE 9

| | Percent |
|---|---|
| 2,3-bis(chloromethyl)quinoxaline | 40 |
| Sodium ligninsulfonate | 15 |
| Hydrated attapulgite | 1.75 |
| Sodium dioctyl sulfosuccinate | 1 |
| Water | 42.25 |

The above aqueous suspension is prepared by first mixing and sand grinding together all of the components except the sodium dioctyl sulfosuccinate and enough of the water to make a concentrated solution of this surfactant. When the product has been ground until the particles of active ingredient are substantially all 5 microns or less, grinding is discontinued and the solution of surfactant is added.

This aqueous suspension is added to water at the rate of 10 kilograms per 100 liters of final fluid volume. The resulting suspension is sprayed on the surface of selected plots within a field at the rate of 600 liters per hectare and thoroughly mixed with the soil to a depth of 4 inches with an appropriate cultural tool. The remainder of the field is left untreated. Pineapples are then planted in the entire field. Fruit eventually harvested from the treated plots is healthy and of excellent quality. The pineapples from the surrounding untreated portions of the field, however, are unmerchantable or of such reduced quality due to heart rot caused by the fungus *Phytophthora cinnamomi.*

EXAMPLE 10

The following compounds are substituted one at a time for 2,3-bis(bromomethyl)-5-nitroquinoxaline of Example 8 in like amount by weight and are formulated and applied in like manner. Like results are obtained.

2,3-bis(bromomethyl)-6-nitroquinoxaline
2,3-bis(iodomethyl)quinoxaline
2,3-bis(bromomethyl)-7-chloro-5-nitroquinoxaline
2,3-bis(bromomethyl)-6-chloroquinoxaline
2,3-bis(chloromethyl)quinoxaline
2,3-bis(fluoromethyl)quinoxaline
2,3-bis(bromomethyl)-6-methylquinoxaline
2,3-bis(bromomethyl)-6-methoxyquinoxaline
2,3-bis(bromomethyl)-6-hydroxyquinoxaline
2,3-bis(bromomethyl)-6-fluoroquinoxaline
2,3-bis(bromomethyl)-6-bromoquinoxaline
2,3-bis( bromomethyl)-1,4-dioxidequinoxaline
2,3-bis(chloromethyl)-1,4- dioxidequinoxaline
2-bromomethyl-3-(1-bromoethyl)quinoxaline
2-bromomethyl-3-(1-bromopentyl)quinoxaline

EXAMPLE 11

| | Percent |
|---|---|
| 2,3-bis(iodomethyl)quinoxaline | 20 |
| Blend of ethoxylated alkylphenols and amine alkylnaphthalene sulfonates | 10 |
| Xylene | 70 |

The above ingredients are stirred together until a homogeneous solution results. This formulation may be emulsified with water or extended with additional oil for application.

This liquid formulation is added to water in an amount to provide 250 grams of the active compound per 100 liters of total fluid. The water emulsion so prepared is applied as a spray to the trees in alternate rows in an orange grove. Application is at the rate of 50 liters per tree of average size (about 15 years of age). Forty liters of this is used on the foliage and the remainder is used to thoroughly wet the lower portion of the main trunk and the soil surrounding it. Four such applications are made during a period of six months between the time the green fruit first appears and the time of harvest. The remaining trees in the grove are left untreated. At the time of harvest, trees that had been treated are healhy and yield a high volume of good quality fruit. The untreated rows, on the contrary, have many unhealthy trees due to foot rot and yield only a little low quality fruit due to fruit brown rot. These two diseases are caused by the fungi *Phytophthora parasitica* and *P. citrophthora* which are controlled by the compound of this invention.

EXAMPLE 12

The following compounds are substituted one at a time for 2,3-bis(iodomethyl)quinoxaline of Example 11 in like amount by weight and are formulated and applied in like manner. Like results are obtained.

2,3-bis(bromoethyl)-6-nitroquinoxaline
2,3-bis(bromomethyl)quinoxaline
2,3-bis(bromomethyl)-7-chloro-5-nitroquinoxaline
2,3-bis(bromomethyl)-6-chloroquinoxaline
2,3-bis(chloromethyl)quinoxaline
2,3-bis(fluoromethyl)quinoxaline
2,3-bis(bromomethyl)-6-methylquinoxaline
2,3-bis(bromomethyl)-6-methoxyquinoxaline
2,3-bis(bromomethyl)-6-hydroxyquinoxaline
2,3-bis(bromomethyl)-6-fluoroquinoxaline
2,3-bis(bromomethyl)-6-bromoquinoxaline
2,3-bis(bromomethyl)-1,4-dioxidequinoxaline
2,3-bis(chloromethyl)-1,4-dioxidequinoxaline
2-bromomethyl-3-(1-bromoethyl)quinoxaline
2-bromomethyl-3-(1-bromopentyl)quinoxaline

EXAMPLE 13

| | Percent |
|---|---|
| 2,3-bis(bromomethyl)-6-chloroquinoxaline | 5 |
| Micaceous talc | 95 |

The above ingredients are blended and micropulverized until substantially all of the particles are 50 microns or less.

This dust formulation is applied to large plots in a wheat field at the rate of 35 kilograms per hectare using an airplane equipped with dusting apparatus. Three such applications are made to the same plots at equally spaced intervals during the period when the wheat heads are developing. At harvest time, wheat in the untreated areas of the field is seriously damaged by the stem rust fungus, *Puccinia graminis* tritici, and yields poorly. Wheat in the treated plots, however, exhibits no stem rust and yields well.

EXAMPLE 14

| | Percent |
|---|---|
| 2,3-bis(bromomethyl)-1-oxidequinoxaline | 10 |
| Attapulgite clay | 25 |
| Kaolinite | 65 |

The active ingredient is blended with attapulgite and ground in a hammer mill to obtain a concentrate which is then diluted into the finished dust by blending with the kaolinite followed by deagglomeration to obtain a uniform mixture.

This dust is used as described in Example 13, except that the rate is reduced to 20 kilograms per hectare, for the control of leaf rusts of wheat, oats, and selected grasses caused by *Puccinia recondita, P. coronata* and *P. glumarum*, respectively.

EXAMPLE 15

| | Percent |
|---|---|
| 2,3-bis(iodomethyl)quinoxaline | 20 |
| Micaceous talc | 60 |
| Attapulgite clay | 19.5 |
| Sodium alkylbenzene sulfonate | 0.5 |

The above ingredients are blended and micropulverized until substantially all of the particles are 50 microns or less.

The wettable powder so prepared is added to water at the rate of 1.5 kilograms per 100 liters to produce a suspension which is sprayed on alternate rows in a lima bean planting at a volume of 800 liters per hectare. The first application is made when the bean plants are about 15 centimeters tall and the treatment is repeated at weekly intervals for a period of 12 weeks. At the end of the test period, the plants in the untreated rows are extensively damaged by bean rust and downy mildew which are caused by the fungi *Uromyces phaseoli* and *Phytophthora phosioli* respectively. Due to the control of these fungi by the compound of this invention, the plants in the treated rows are healthy.

EXAMPLE 16

The following compounds are substituted one at a time for 2,3-bis(bromomethyl) - 6-chloroquinoxaline of Example 13 in like amount by weight and are formulated and applied in like manner. Like results are obtained.

2,3-bis(bromoethyl)-6-nitroquinoxaline
2,3-bis(bromomethyl)quinoxaline
2,3-bis(iodomethyl)quinoxaline
2,3-bis(bromomethyl)-7-chloro-5-nitroquinoxaline
2,3-bis(chloromethyl)quinoxaline
2,3-bis(fluoromethyl)quinoxaline
2,3-bis(bromomethyl)-6-methylquinoxaline
2,3-bis(bromomethyl)-6-methoxyquinoxaline
2,3-bis(bromomethyl)-6-hydroxyquinoxaline
2,3-bis(bromomethyl)-6-fluoroquinoxaline
2,3-bis(bromomethyl)-6-bromoquinoxaline
2,3-bis(bromomethyl)-1,4-dioxidequinoxaline
2,3-bis(chloromethyl)-1,4-dioxidequinoxaline
2-bromomethyl-3-(1-bromoethyl)quinoxaline
2-bromomethyl-3-(1-bromopentyl)quinoxaline

EXAMPLE 17

| | Percent |
|---|---|
| Wettable powder of Example 5 | 10 |
| Micaceous talc | 90 |

The above ingredients are blended and deagglomerated to obtain a uniform dust.

The dust so prepared when applied at rates in the range of 10 to 40 kilograms per hectare one to ten times during a growing season in the manner described in Example 13 controls such divergent diseases as downy mildew of spinach (caused by *Peronospora effusa*) and blast of rice (caused by *Piricularia oryzae*).

EXAMPLE 18

The wettable powders of Example 6 may be substituted one at a time for the wettable powder of Example 17 in like amount by weight. They are formulated and applied in like manner; like results are obtained.

EXAMPLE 19

| | Percent |
|---|---|
| 2,3-bis(bromomethyl)quinoxaline | 30 |
| Kerosene | 68 |
| Soya lecithin | 2 |

This composition is prepared by sand grinding or ball milling the above ingredients until a uniform dispersion is obtained in which substantially all of the particles are 20 microns or less. The formulation may be diluted with additional solvent or with other spray oils of the aliphatic hydrocarbon type for application.

The above liquid formulation is used in the manner described in Example 11 with like results.

EXAMPLE 20

The following compounds may be substituted one at a time for 2,3-bis(bromomethyl)quinoxaline of Example 19 in like amount by weight and are formulated and applied in like manner. Like results are obtained.

2,3-bis(bromoethyl)-6-nitroquinoxaline
2,3-bis(bromomethyl)-6-methylquinoxaline
2,3-bis(iodomethyl)quinoxaline
2,3-bis(bromomethyl)-7-chloro-5-nitroquinoxaline
2,3-bis(bromomethyl)-6-chloroquinoxaline
2,3-bis(chloromethyl)quinoxaline
2,3-bis(fluoromethyl)quinoxaline
2,3-bis(bromomethyl)-6-methoxyquinoxaline
2,3-bis(bromomethyl)-6-hydroxyquinoxaline
2,3-bis(bromomethyl)-6-fluoroquinoxaline
2,3-bis(bromomethyl)-6-bromoquinoxaline
2,3-bis(bromomethyl)-1,4-dioxidequinoxaline
2,3-bis(chloromethyl)-1,4-dioxidequinoxaline
2-bromomethyl-3-(1-bromoethyl)quinoxaline
2-bromomethyl-3-(1-bromopentyl)quinoxaline

What is claimed is:

1. A process for protecting vegetation from fungi which comprises applying to the locus of the vegetation a plant protective amount of a compound of the formula:

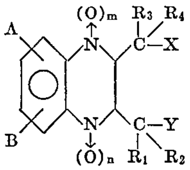

where $R_1$ and $R_3$ are separately hydrogen or an alkyl of one through four carbon atoms;
$R_2$ and $R_4$ are separately hydrogen or methyl;
X and Y are separately chlorine, bromine, fluorine or iodine;
A is alkyl of one through four carbon atoms, alkoxy of one through four carbon atoms, chlorine, bromine, fluorine, iodine, nitro, hydroxy or hydrogen;
B is hydrogen, methyl, fluorine, chlorine, bromine or nitro; and
$m$ and $n$ are separately 0 or 1.

2. A process as defined in claim 1 where $R_1$, $R_2$, $R_3$, $R_4$ and A are hydrogen; $m$ and $n$ are 0; and X and Y are the same and are selected from the group consisting of bromine and iodine.

3. A process as defined in claim 2 where B is hydrogen and X and Y are bromine.

4. A process as defined in claim 2 where B is hydrogen and X and Y are iodine.

5. A process for protecting vegetation from fungi which comprises applying to the soil a plant protective amount of a compound of the formula:

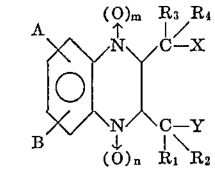

where $R_1$ and $R_3$ are alkyl of one through four carbon atoms;
$R_2$ and $R_4$ are separately hydrogen or methyl;
X and Y are separately chlorine, bromine, fluorine or iodine;
A is alkyl of one through four carbon atoms, alkoxy of one through four carbon atoms, chlorine, bromine, fluorine, iodine, nitro, hydroxy or hydrogen;
B is hydrogen, methyl, fluorine, chlorine, bromine or nitro; and
$m$ and $n$ are separately 0 or 1.

6. A process as defined in claim 5 where $R_1$, $R_2$, $R_3$ $R_4$ and A are hydrogen; $m$ and $n$ are 0; and X and Y are the same and are selected from the group consisting of bromine and iodine.

7. A process as defined in claim 5 where B is hydrogen and X and Y are bromine.

8. A process as defined in claim 5 where B is hydrogen and X and Y are iodine.

9. A process for protecting harvested vegetation from fungi which comprises applying to said harvested vegetation a protective amount of a compound of the formula:

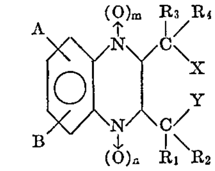

where $R_1$ and $R_3$ are alkyl of one through four carbon atoms;
$R_2$ and $R_4$ are separately hydrogen or methyl;
X and Y are sepately chlorine, bromine, fluorine or iodine;
A is alkyl of one through four carbon atoms, alkoxy of one through four carbon atoms, chlorine, bromine, fluorine, iodine, nitro, hydroxy or hydrogen;
B is hydrogen, methyl, fluorine, chlorine, bromine or nitro; and
$m$ and $n$ are separately 0 or 1.

10. A process as defined in claim 9 where $R_1$, $R_2$, $R_3$, $R_4$ and A are hydrogen; $m$ and $n$ are 0; and X and Y are the same and are selected from the group consisting of bromine and iodine.

11. A process as defined in claim 9 where B is hydrogen and X and Y are bromine.

12. A process as defined in claim 9 where B is hydrogen and X and Y are iodine.

References Cited

UNITED STATES PATENTS

| | | | |
|---|---|---|---|
| 3,040,046 | 6/1962 | Sasse et al. | 260—250 |
| 3,146,161 | 8/1964 | Grewe et al. | 424—250 |
| 3,157,654 | 11/1964 | Sasse et al. | 260—250 |
| 3,186,905 | 6/1965 | Hattori et al. | 424—250 |

ALBERT T. MEYERS, Primary Examiner

D. M. STEPHENS, Assistant Examiner